(12) United States Patent
Duncan et al.

(10) Patent No.: US 8,144,321 B2
(45) Date of Patent: Mar. 27, 2012

(54) ENCODING OPTICAL SPECTRA USING A DMD ARRAY

(75) Inventors: Walter M. Duncan, Dallas, TX (US); James N. Malina, Dallas, TX (US); Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 565 days.

(21) Appl. No.: 12/256,005

(22) Filed: Oct. 22, 2008

(65) Prior Publication Data
US 2010/0097604 A1    Apr. 22, 2010

(51) Int. Cl.
*G01J 3/28* (2006.01)
(52) U.S. Cl. .......... 356/310; 356/326; 356/330
(58) Field of Classification Search .......... 356/310, 356/330
See application file for complete search history.

(56) References Cited

U.S. PATENT DOCUMENTS

| | | | |
|---|---|---|---|
| 4,615,619 A * | 10/1986 | Fateley | 356/310 |
| 5,504,575 A | 4/1996 | Stafford | |
| 5,923,036 A | 7/1999 | Tague, Jr. et al. | |
| 5,930,027 A | 7/1999 | Mentzer et al. | |
| 7,324,196 B2 | 1/2008 | Goldstein et al. | |

* cited by examiner

*Primary Examiner* — F. L Evans
(74) *Attorney, Agent, or Firm* — Warren L. Franz; Wade J. Brady, III; Frederick J. Telecky, Jr

(57) ABSTRACT

According to one embodiment of the present invention, a system for encoding an optical spectrum includes a dispersive element, a digital micromirror device (DMD) array, a detector, and a controller. The dispersive element receives light from a source and disperses the light to yield light components of different wavelengths. The digital micromirror device (DMD) array has micromirrors that modulate the light to encode an optical spectrum of the light. The detector detects the light that has been modulated. The controller generates an intensity versus time waveform representing the optical spectrum of the detected light.

23 Claims, 3 Drawing Sheets

ENCODING OPTICAL SPECTRA USING A DMD ARRAY

TECHNICAL FIELD

This invention relates generally to the field of light modulation and more specifically to encoding optical spectra using a DMD array.

BACKGROUND

A digital micromirror device (DMD) array may include hundreds of thousands of mirrors that modulate light. For example, the mirrors may direct certain portions of light towards a detector. Accordingly, a DMD array may be used to apply a mask to encode light.

SUMMARY OF THE DISCLOSURE

According to one embodiment of the present invention, a system for encoding an optical spectrum includes a dispersive element, a digital micromirror device (DMD) array, a detector, and a controller. The dispersive element receives light from a source and disperses the light to yield light components of different wavelengths. The digital micromirror device (DMD) array has micromirrors that modulate the light to encode an optical spectrum of the light. The detector detects the light that has been modulated. The controller generates an intensity versus time waveform representing the optical spectrum of the detected light.

Certain embodiments of the invention may provide one or more technical advantages. A technical advantage of one embodiment may be that a DMD array can be irradiated with a light field having a plurality of wavelengths. A time changing mask can be applied to the light field in order to generate an electrical intensity versus time waveform representing an optical spectrum of the light. Another technical advantage of one embodiment may be that a single element detector may be used to detect the light from the DMD array. Accordingly, an array detector is not required to encode the intensities of light versus wavelength.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF EXAMPLE EMBODIMENTS

Embodiments of the present invention and its advantages are best understood by referring to FIGS. 1 through 5 of the drawings, like numerals being used for like and corresponding parts of the various drawings.

Figure 1:
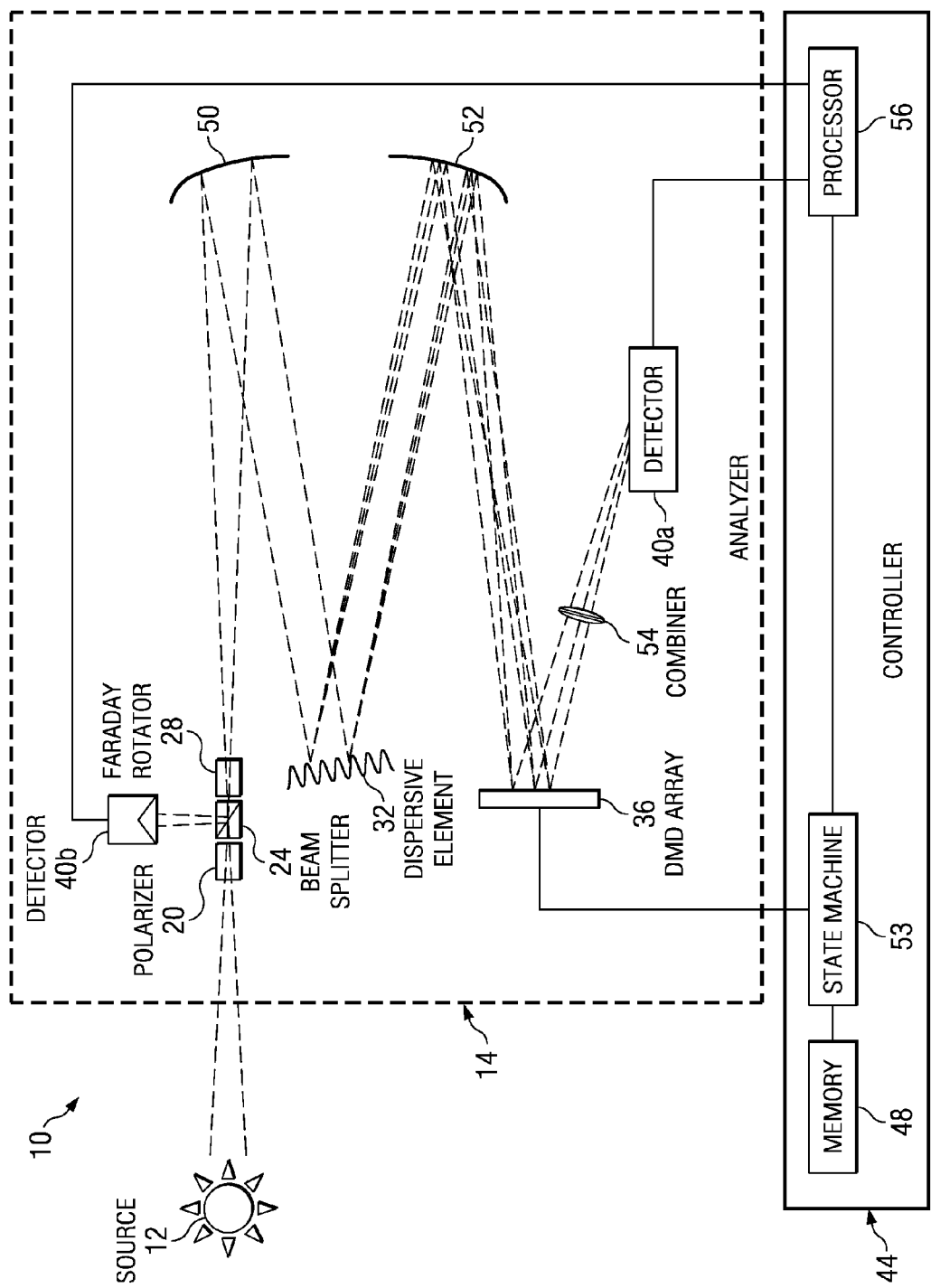
FIG. 1 illustrates one embodiment of a system that may be used to encode a spectrum from light received from a source.

FIG. 1 illustrates one embodiment of a system 10 that may be used to encode a spectrum from light received from a source 12. In the illustrated example, system 10 includes an analyzer 14 and a controller 44. Analyzer 14 includes a polarizer 20, a beam splitter 24, a Faraday rotator 28, a dispersive element 32, a spatial light modulator such as a digital micromirror device (DMD) array 36, a detector 40 (shown as 40a or 40b), reflective surfaces 50 and 52, and a combiner 54 (such as a lens).

In particular embodiments, light may travel along a path that passes through polarizer 20, beam splitter 24, Faraday rotator 28, reflective surface 50, dispersive element 32, reflective surface 52, DMD array 36, combiner 54, and detector 40a. In these embodiments, detector 40a receives the light directly from DMD array 36. In other embodiments, light may travel along a path that passes through polarizer 20, beam splitter 24, Faraday rotator 28, reflective surface 50, dispersive element 32, reflective surface 52, and DMD array 36, and then passes back through reflective surface 52, dispersive element 32, reflective surface 50, Faraday rotator 28, beam splitter 24, and detector 40b.

In an example of operation, dispersive element 32 is configured to receive light from source 12 and disperse the light to yield light components of different wavelengths. DMD array 36 comprises micromirrors configured to modulate the light in order to encode the light signal into an electrical amplitude versus time. Detector 40 is configured to detect the light. Controller 44 generates an intensity versus time waveform representing an optical spectrum of the light.

Any suitable spectrum may be generated from any suitable light source. Examples of light sources include solid, liquid, gaseous, plasma, glow, arc, and discharge sources. For example, light that has been reflected, transmitted, or emitted may yield a reflection, transmission, or emission spectrum, respectively. As another example, ultra-violet (UV), visible (Vis) near infrared (NIR), infrared (IR) or other light may yield a UV, Vis, NIR, IR, or other spectrum, respectively.

In particular embodiments, polarizer 20 polarizes light. Beam splitter 24 splits the light. Faraday rotator 28 rotates the polarization of light. In particular embodiments, dispersive element 32 (or "dispersing portion") disperses light into components of different wavelengths. Dispersive element 32 may have any suitable shape. In particular embodiments, dispersive element 32 may have a flat, planar shape. Dispersive element 32 may comprise a diffraction grating, a holographic element, a prism, or other dispersive device.

In particular embodiments, a spatial light modulator may comprise a DMD array (or "DMD apparatus"), a liquid crystal on silicon (LCOS or LCoS) device, or a transmissive solution device like an liquid-crystal display (LCD) device. DMD array 36 may comprise an array of hundreds of thousands of DMD structures that include mirrors. The array may have any suitable size, for example, 320×240, 640×480, 720× 480, 1280×720, 1920×1080 pixels. The mirrors reflect light to modulate the light. DMD array 36 may modulate light by turning on or off at least a subset of the mirrors. A mirror may be turned on to reflect light towards detector 40 or turned off to reflect light away from detector 40.

In particular embodiments, DMD array 36 applies spatial masks that implement transform functions. Examples of transform functions include single-slit wavelength scanning, simple multiple-slit filtering, Fourier, and multiplexed Hadamard transform functions. A spectral template mask may be used to detect one or more particular components.

In particular embodiments, detector (or "detecting element") 40 (40a, 40b) detects photons and converts the photons into electrical signals representing the photons. Detector 40 may comprise one or more pixels. For example, detector 40 may be a single pixel detector or a two dimensional array detector.

In particular embodiments, controller (or "control system") 44 generates an intensity versus time waveform representing an optical spectrum of the light. In particular embodiments, controller 44 may control the operations of DMD array 36 and/or detector 40. In particular embodiments, controller 44 may instruct DMD array 36 to modulate light reaching the detector in order to encode the light signal reaching the detector into a time versus intensity waveform or signal. In particular embodiments, controller 44 may include a memory 48, a state machine 53, and a processor 56. An example of controller 44 is described in more detail with reference to FIG. 3.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic comprising software, hardware, and/or other logic. As used in this document, "each" refers to each member of a set or each member of a subset of a set.

Figure 2:
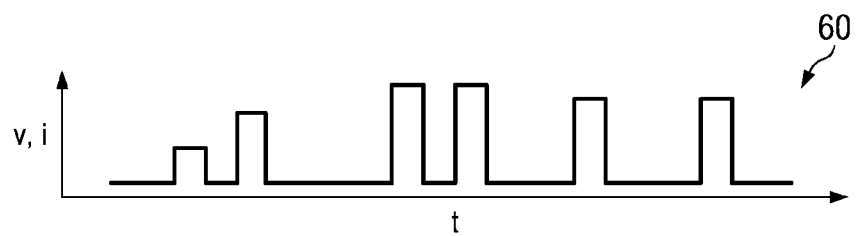
FIG. 2 illustrates an example of an intensity versus time waveform.

FIG. 2 illustrates an example of an intensity versus time waveform 60. Intensity represents the intensity of light received by detector 40a or 40b, which may be given by voltage.

Figure 3:
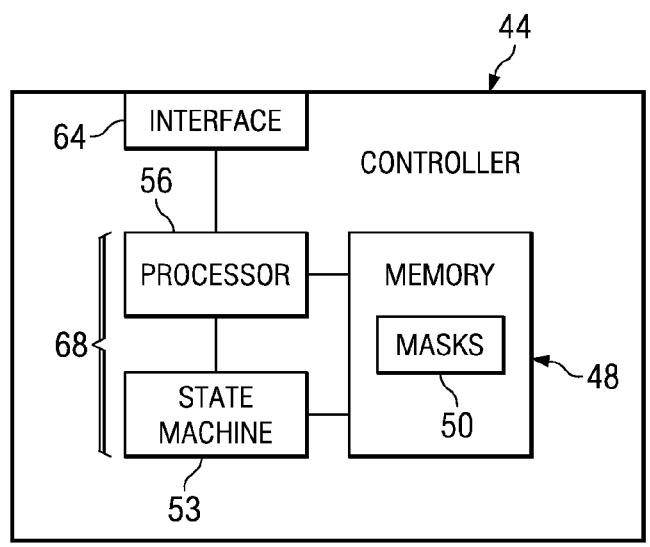
FIG. 3 illustrates an example of one embodiment of a controller that may be used with the system of FIG. 1.

FIG. 3 illustrates an example of one embodiment of controller 44 that may be used with system 10 of FIG. 1. In certain examples, controller 44 includes an interface 64, logic 68 (such as a processor 56 and state machine 53), and memory 48. Interface 64 receives input, sends output, processes the input and/or output, and/or performs other suitable operation. Interface 64 may comprise hardware and/or software.

Logic 68 performs the operations of the component, for example, executes instructions to generate output from input. Logic 68 may include hardware, software, and/or other logic. Logic 68 may be encoded in one or more tangible media and may perform operations when executed by a computer. Certain logic 68, such as processor 56, may manage the operation of a component. Examples of processor 56 include one or more computers, one or more microprocessors, one or more applications, and/or other logic.

Memory 48 stores information, such as software, for example, logic 68. Memory 48 may comprise one or more tangible, computer-readable, and/or computer-executable storage media. Examples of memory 48 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server) and/or other computer-readable medium.

In certain embodiments, memory 48 stores masks 50. Masks 50 may include pre-processed bit planes and/or dynamically-created masks. The dynamically-created masks may be generated using algorithms and/or detector feedback from detector 35.

In particular embodiments, state machine 53 may instruct DMD array 36 to modulate light to encode the light. For example, state machine 53 may instruct DMD array 36 to encode light by applying a continuous mask transform to perform a spatial-to-wavelength transform. The mask transform may rotate the space in order to align the spectrum.

In particular embodiments, controller 44 may use a mask to detect a particular spectral shape. An example of this is described in more detail with reference to FIGS. 4A and 4B. In particular embodiments, state machine 53 may instruct DMD array 36 to encode light using pulse width modulation. Pulse width modulation may be used to generate a gray scale encoding. In other embodiments, state machine 53 may instruct DMD array 36 to encode light as a digital bit stream.

In particular embodiments, controller 44 may determine the intensities of wavelengths using the micromirrors of DMD array 36. In the embodiments, micromirrors are aligned with particular spectral bands. For example, a column of mirrors may correspond to a particular wavelength. If detector 40 detects light from specific micromirrors, then controller 44 may determine the intensity of the spectral band that corresponds to the mirrors. In one example, substantially all mirrors may be turned off to obtain dark values for a dark mode. A column may then be turned on, and detector 40 may detect the intensity of the light at the wavelength corresponding to the column. Different columns may be turned on to detect more intensities at different wavelengths.

In particular embodiments, an incoming spectrum may cause detector 40 to overload if the signal is too bright. In certain embodiments, a slit may be moved across the columns or rows of DMD array 36. If detector 40 overloads, or saturates, for certain wavelengths, DMD array 36 can pulse width modulate (PWM) the signal until the signal comes back into the range. Controller 44 can store the amount of PWM used, and reapply a scale factor when processing the spectrum.

In particular embodiments, controller 44 may adjust a mask and/or pulse width modulation (PWM) to control brightness. In the embodiments, any suitable mask and/or PWM mask duration may be used initially. In certain embodiments, a mask and PWM mask duration that can be adjusted to be brighter or darker may be used, such as a mask with 25% to 75% of the pixels that are in the "on" position (or "on pixels"). The PWM duration may be in the range of 25% to 75%. For example, the initial mask may be a checkerboard mask with 50% of the pixels on and a mask duration of 50%.

In the embodiments, if the light detected by detector 40 is too bright, then the mask may be changed to decrease the number of on pixels and/or the PWM duration may be decreased. If the light is too dim, then the mask may be changed to increase the number of on pixels and/or the PWM duration may be increased. The mask and/or PWM duration may be adjusted until the brightness goal is achieved.

In particular embodiments, controller 44 may perform optical shaping to determine mirrors that are on a light path. In one example, substantially all mirrors of DMD array 36 may be turned off to obtain dark values of detector 40 for a dark mode. A pixel set of one or more mirrors may be turned on. If the detector value is greater than the dark value, the pixel set may be regarded as on the light path. The procedure is repeated for most or all of the pixel sets of DMD array 36.

In particular embodiments, controller 44 may compare spectra. As an example, controller 44 may detect spectra from a first source 12 and a second source 12 (second source 12 not shown). Controller 44 may switch back and forth between sampling first source 12 and sampling second source 12, and may generate a first and a second waveform for the first and second sources 12, respectively. If the spectra of the sources 12 are similar, the waveforms should match. If not, the waveforms should be different. As another example, controller 44 may compare a spectrum of detected light with a target spectrum. If the spectra are similar, the waveforms of the spectra should match. If not, the waveforms should be different.

Controller 44 may scan DMD array 36 in any suitable manner. As an example, controller 44 may instruct DMD array 36 to detect a trigger signal associated with source 12, and synchronize the modulation of light according to the trigger signal. As an example, controller 44 may instruct DMD array 36 to change mirrors that are orthogonal to a wavelength scan direction to prevent saturation of light. As another example, The scanning speed may be varied.

In particular embodiments, controller 44 analyzes the spectrum. For example, controller 44 may identify one or more materials of source 12 from the optical spectrum to yield a spectroscopic encoding. As another example, controller 44 may determine proportions of one or more materials of source 12 from the optical spectrum to yield a chromatographic encoding.

Figure 4A:
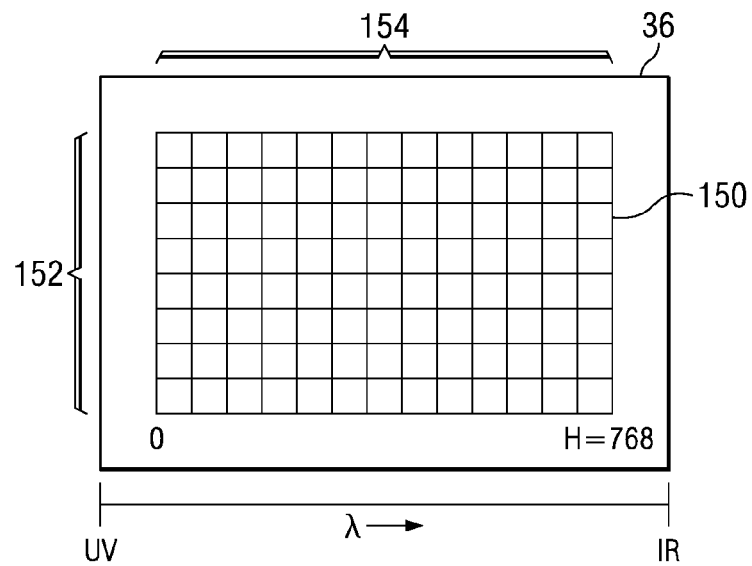
FIGS. 4A and 4B illustrate an example of a mask that may be used to detect a particular spectral shape.
Figure 4B:
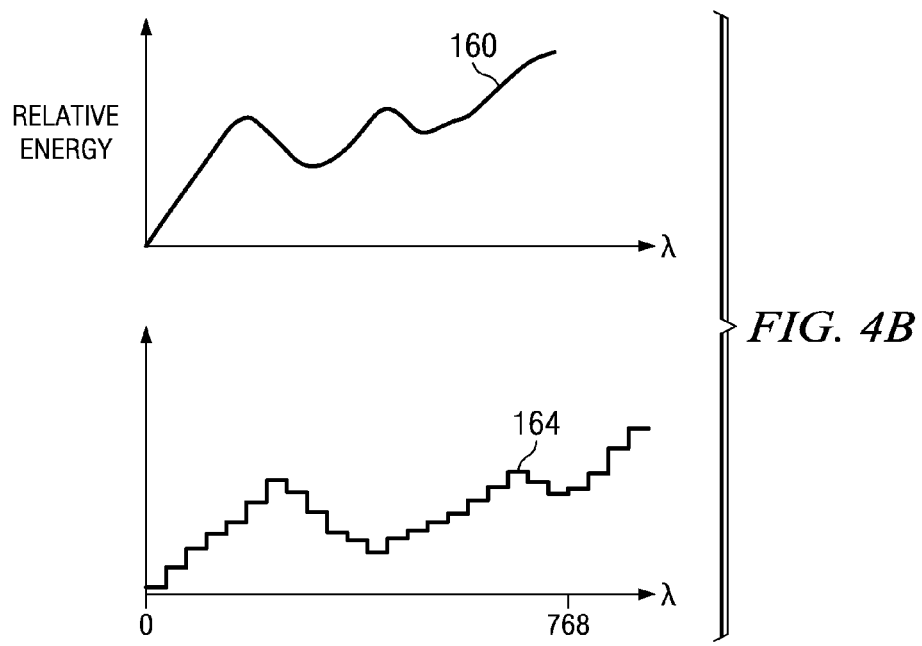

FIGS. 4A and 4B illustrate an example of a mask that may be used to detect a particular spectral shape. FIG. 4A illustrates DMD array 36 with an active area 150 and rows 152 and columns 154. Light from dispersive element 32 spreads across DMD array 36. In the example, the wavelength changes in the direction defined by the long sides of rows 152.

FIG. 4B illustrates a spectral shape 160 and a DMD mask graph 164. Spectral shape 160 may represent a spectral shape for which a match is to be detected. In the example, the shape has a particular intensity at a particular wavelength. DMD mask graph 164 may represent a DMD mask that may be used with DMD array 36 to detect the spectral shape represented by spectral shape 160. In the example, the mask is set to detect the particular intensity and wavelength of spectral shape 160. Detector 40 may detect the resulting signal. A well-correlated signal may indicate that the spectral shape is detected.

Figure 5:
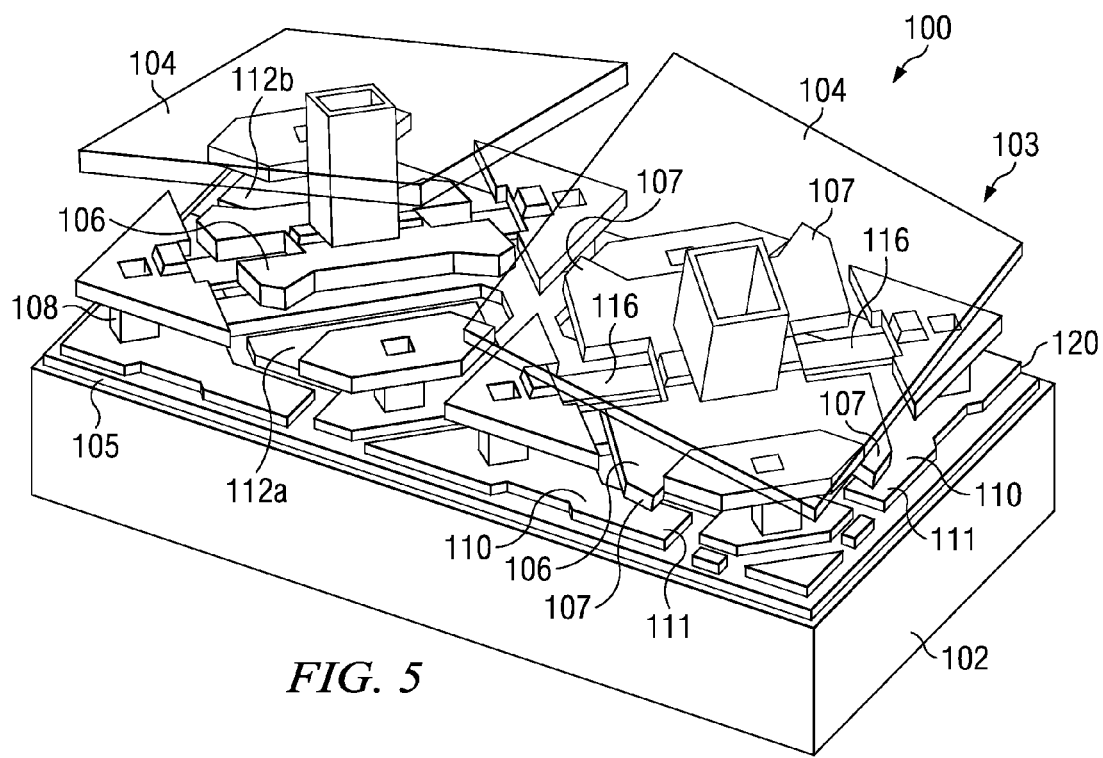
FIG. 5 illustrates a perspective view of a portion of an example of a DMD array that may be used with the system of FIG. 1.

FIG. 5 illustrates a perspective view of a portion 100 of an example of a DMD array 36 that may be used with system 10 of FIG. 1. DMD array 36 may have an array of hundreds of thousands of DMD structures 103 that include mirrors that move to reflect light.

In the illustrated example, portion 100 includes a substrate 102 with an insulating layer 105 disposed outwardly from substrate 102. A conductive layer 120 is disposed outwardly from insulating layer 105. Conductive layer 120 includes conductive conduits 110 (with landing pads 111) and electrodes 112 coupled as shown. A DMD structure 103 is disposed outwardly from substrate 102. DMD structure 103 includes posts 108, yoke 106 (with yoke tips 107), a hinge 116, and a micromirror 104 coupled as shown.

In particular embodiments, substrate 102 may comprise a semiconductor substrate such as a complementary metal-oxide semiconductor (CMOS) substrate. Insulating layer 103 operates to insulate substrate 102 from electrodes 112 and conductive conduits 110, and may comprise an oxide. Conductive layer 120 operates as a conductor, and may comprise an aluminum alloy or other suitable conductive material. Electrodes 112 and conductive conduits 110 are formed within conductive layer 120.

DMD structure 103 moves to selectively reflect light. A micromirror 104 comprises a reflective surface of any suitable size and shape. In particular embodiments, micromirror 104 has a square shape with a length of less than 20, 17, 13, or 10 microns. Posts 108 support hinge 116, which moves to tilt micromirror 104 to an "on" or "off" state to selectively reflect light. Micromirror 104 may tilt up to plus or minus less than 8, 10, or more than 12 degrees.

In operation, conductive layer 120 receives a bias voltage that at least partially contributes to creation of electrostatic forces between electrodes 112, micromirrors 104, and/or yoke 106. The electrostatic forces cause DMD structure 103 to rotate on the axis defined by hinge 116. The movement stops when a part of DMD structure 103 touches an obstruction, such as when yoke tips 107 touch landing pad 111.

Modifications, additions, or omissions may be made to portion 100 without departing from the scope of the invention. The components of portion 100 may be integrated or separated. Moreover, the operations of portion 100 may be performed by more, fewer, or other components. Additionally, operations of portion 100 may be performed using any suitable logic comprising software, hardware, and/or other logic.

Modifications, additions, or omissions may be made to the methods described herein without departing from the scope of the invention. The methods may include more, fewer, or other steps. Additionally, steps may be performed in any suitable order.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Certain embodiments of the invention may provide one or more technical advantages. A technical advantage of one embodiment may be that a DMD array can be irradiated with a light field having a plurality of wavelengths. A time changing mask can be applied to the light field in order to generate an electrical intensity versus time waveform representing an optical spectrum of the light. Another technical advantage of one embodiment may be that a single element detector may be used to detect the light from the DMD array. Accordingly, an array detector is not required to encode the intensities of light versus wavelength.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system for encoding an optical spectrum, comprising:
   a dispersive element configured to receive light from a source and disperse the light into a plurality of light components of a plurality of different wavelengths;
   a spatial light modulator configured to modulate the light to encode an optical spectrum of the light;
   a detector configured to detect the light that has been modulated; and
   a controller configured to generate an intensity versus time waveform representing the optical spectrum of the detected light;
   the spatial light modulator using a reflective mask comprising a specific pattern of on and off mirrors configured to detect a particular spectral shape; and
   the controller further configured to detect the particular spectral shape by determining that the detector has detected a well-correlated signal and establishing that the particular spectral shape has been detected.

2. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light;
the spatial light modulator comprising a plurality of micromirrors comprising one or more subsets of micromirrors, each subset of micromirrors corresponding to one or more particular wavelengths; and
the controller configured to determine intensities of the wavelengths by repeating the following for each subset of the one or more subsets:
turning on a subset of micromirrors;
turning off the other subsets of micromirrors; and
determining the intensity detected by the detector as the intensity of the one or more particular wavelengths corresponding to the each subset.

3. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light;
the controller configured to control detector intensity by:
selecting a mask that yields a first number of "on pixels";
if the light detected by the detector is too bright, selecting a next mask that yields a second number of on pixels, the second number less than the first number; and
if the light detected by the detector is too dark, selecting a next mask that yields a third number of on pixels, the third number greater than the first number.

4. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light;
the controller configured to control brightness by:
selecting a first pulse width modulation (PWM) duration;
if the light detected by the detector is too bright, selecting a second PWM duration that is less than the first PWM duration; and
if the light detected by the detector is too dark, selecting a third PWM duration that is greater than the first PWM duration.

5. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light; to generate a next intensity versus time waveform representing the optical spectrum of light detected from a next source; and to compare the intensity versus time waveform with the next intensity versus time waveform.

6. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light; and to identify one or more materials of the source from the optical spectrum to yield a spectroscopic encoding.

7. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light; and to determine one or more proportions of one or more materials of the source from the optical spectrum to yield a chromatographic encoding.

8. A system for encoding an optical spectrum, comprising:
a dispersive element configured to receive light from a source and disperse the light into a plurality of light components of a plurality of different wavelengths;
a spatial light modulator configured to modulate the light to encode an optical spectrum of the light;
a detector configured to detect the light that has been modulated; and
a controller configured to generate an intensity versus time waveform representing the optical spectrum of the detected light; to detect a trigger signal associated with the source; and to synchronize the modulation of the light according to the trigger signal.

9. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated; and
generating, by a control system, an intensity versus time waveform representing the optical spectrum of the detected light;
wherein modulating the light includes applying to the spatial light modulator a reflective mask comprising a specific pattern of on and off mirrors configured to detect a particular spectral shape; and wherein the method further includes detecting the particular spectral shape by determining that the detecting element has detected a well-correlated signal; and establishing that the particular spectral shape has been detected.

10. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated; and
generating, by a control system, an intensity versus time waveform representing the optical spectrum of the detected light;
the spatial light modulator comprising a plurality of micromirrors comprising one or more subsets of micromirrors, each subset of micromirrors corresponding to one or more particular wavelengths; and
the method further comprising determining intensities of the wavelengths by repeating the following for each subset of the one or more subsets:
turning on a subset of micromirrors;
turning off the other subsets of micromirrors; and
determining the intensity detected by the detecting element as the intensity of the one or more particular wavelengths corresponding to the each subset.

11. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated;
generating, by a control system, an intensity versus time waveform representing the optical spectrum of the detected light; and
controlling detector intensity by:
selecting a mask that yields a first number of "on pixels";
if the light detected by the detector is too bright, selecting a next mask that yields a second number of on pixels, the second number less than the first number; and
if the light detected by the detector is too dark, selecting a next mask that yields a third number of on pixels, the third number greater than the first number.

12. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated;
generating, by a control system, an intensity versus time waveform representing the optical spectrum of the detected light; and
controlling brightness by:
selecting a first pulse width modulation (PWM) duration;
if the light detected by the detector is too bright, selecting a second PWM duration that is less than the first PWM duration; and
if the light detected by the detector is too dark, selecting a third PWM duration that is greater than the first PWM duration.

13. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated;
generating, by a control system, an intensity versus time waveform representing the optical spectrum of the detected light;
generating a next intensity versus time waveform representing the optical spectrum of light detected from a next source; and
comparing the intensity versus time waveform with the next intensity versus time waveform.

14. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated;
generating, by a control system, an intensity versus time waveform representing the optical spectrum of the detected light; and
identifying one or more materials of the source from the optical spectrum to yield a spectroscopic encoding.

15. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;
detecting, by a detecting element, the light that has been modulated; and
generating, by a control system, an intensity versus time waveform representing the optical spectrum of the detected light;
determining one or more proportions of one or more materials of the source from the optical spectrum to yield a chromatographic encoding.

16. A method for encoding an optical spectrum, comprising:
receiving, by a dispersing portion, light from a source;
dispersing, by the dispersing portion, the light into a plurality of light components of a plurality of different wavelengths;
modulating, by a spatial light modulator, the light to encode an optical spectrum of the light;

detecting, by a detecting element, the light that has been modulated;

generating, by a control system, an intensity versus time waveform representing the optical spectrum of the detected light;

detecting a trigger signal associated with the source; and synchronizing the modulation of the light according to the trigger signal.

17. A system for encoding an optical spectrum, comprising:

a dispersive element configured to:
- receive light from a source; and
- disperse the light into a plurality of light components of a plurality of different wavelengths;

a digital micromirror device (DMD) array comprising a plurality of micromirrors configured to modulate the light to encode an optical spectrum of the light, the DMD array using a reflective mask comprising a specific pattern of on and off mirrors configured to detect a particular spectral shape, the plurality of micromirrors comprising one or more subsets of micromirrors, each subset of micromirrors corresponding to one or more particular wavelengths;

a detector configured to detect the light that has been modulated directly from the DMD array; and a controller configured to:
- generate an intensity versus time waveform representing the optical spectrum of the detected light;
- detect the particular spectral shape by:
  - determining that the detector has detected a well-correlated signal; and
  - establishing that the particular spectral shape has been detected;
- determine intensities of the wavelengths by repeating the following for each subset of the one or more subsets:
  - turning on a subset of micromirrors;
  - turning off the other subsets of micromirrors; and
  - determining the intensity detected by the detector as the intensity of the one or more particular wavelengths corresponding to the each subset;
- control brightness by:
  - selecting a mask that yields a first number of "on pixels";
  - if the light detected by the detector is too bright, selecting a next mask that yields a second number of on pixels, the second number less than the first number; and
  - if the light detected by the detector is too dark, selecting a next mask that yields a third number of on pixels, the third number greater than the first number;
- control detector intensity by:
  - selecting a first pulse width modulation (PWM) duration;
  - if the light detected by the detector is too bright, selecting a second PWM duration that is less than the first PWM duration; and
  - if the light detected by the detector is too dark, selecting a third PWM duration that is greater than the first PWM duration;
- generate a next intensity versus time waveform representing the optical spectrum of light detected from a next source, and compare the intensity versus time waveform with the next intensity versus time waveform;
- identify one or more materials of the source from the optical spectrum to yield a spectroscopic encoding;
- determine one or more proportions of one or more materials of the source from the optical spectrum to yield a chromatographic encoding; and
- detect a trigger signal associated with the source, and synchronize the modulation of the light according to the trigger signal.

18. A method comprising:

dispersing an optical spectrum of light received from a light source to provide a spatial distribution of components of different wavelengths of the light;

controlling an array of mirrors of a digital micromirror device to apply a spatial mask to selectively reflect different parts of the spatial distribution at predetermined different times onto a detector; and generating a time varying signal representative of the intensities of the different parts reflected at the different times onto the detector.

19. The method of claim 18, further including using the generated signal to identify one or more materials of the source.

20. The method of claim 19, further including using the generated signal to determine proportions of the one or more materials.

21. The method of claim 18, wherein generating the signal includes generating a time varying voltage signal having variations in voltage amplitude corresponding to variations in intensities of light reflected onto the detector.

22. The method of claim 18, wherein controlling the array of minors includes controlling on and off states of columns of mirrors to selectively reflect different wavelengths of light onto the detector.

23. The method of claim 18, wherein controlling the array of minors includes controlling the on and off states of minors to apply the spatial mask to implement a transform function.

\* \* \* \* \*